United States Patent
Mau (10) Patent No.: US 7,222,139 B2
(45) Date of Patent: May 22, 2007

(54) METHOD, SYSTEM AND PROGRAM FOR SYNCHRONIZING DATA

(75) Inventor: Louis S. Mau, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 10/208,579

(22) Filed: Jul. 30, 2002

(65) Prior Publication Data

US 2004/0025072 A1 Feb. 5, 2004

(51) Int. Cl.
*G06F 17/30* (2006.01)

(52) U.S. Cl. .............................. 707/204; 707/2; 707/4; 707/201; 713/181

(58) Field of Classification Search ............. 707/104.1, 707/200, 204, 2, 4, 201; 712/1; 700/1; 713/181, 713/400
See application file for complete search history.

(56) References Cited

U.S. PATENT DOCUMENTS

| 5,640,556 | A | * | 6/1997 | Tamura ........................ 707/10 |
| 5,729,735 | A | | 3/1998 | Meyering |
| 6,266,669 | B1 | | 7/2001 | Brodersen et al. |
| 6,415,280 | B1 | * | 7/2002 | Farber et al. ................... 707/2 |
| 6,615,276 | B1 | * | 9/2003 | Mastrianni et al. ......... 709/250 |
| 6,721,871 | B2 | * | 4/2004 | Piispanen et al. ............... 712/1 |
| 7,035,847 | B2 | * | 4/2006 | Brown et al. ................... 707/4 |
| 7,039,656 | B1 | * | 5/2006 | Tsai et al. ..................... 707/201 |
| 2002/0032489 | A1 | * | 3/2002 | Tynan et al. .................... 700/1 |
| 2002/0073099 | A1 | * | 6/2002 | Gilbert et al. ............ 707/104.1 |
| 2003/0005306 | A1 | * | 1/2003 | Hunt et al. ................... 713/181 |

FOREIGN PATENT DOCUMENTS

| WO | 0103409 | 1/2001 |
| WO | 0155851 | 8/2001 |

OTHER PUBLICATIONS

"vCard Overview." [online] [retrieved on Jun. 9, 2002] Retrieved from http://www.icm.org/pdi/vcardoverview.html.

(Continued)

*Primary Examiner*—Alford Kindred
*Assistant Examiner*—Sheree Brown
(74) *Attorney, Agent, or Firm*—David W. Victor; Konrad Raynes & Victor (57) ABSTRACT

Provided are a method, system, and program for synchronizing data. A client data record is received from a client and a determination is made of a server data record corresponding to the client data record and a stored digest generated from a previously received version of the received client data record. A current digest is computed from the received client data record. A determination is then made as to whether the computed current digest matches the stored digest. The server data record is updated with modified data from the received client data record if the computed digest and stored digest do not match.

20 Claims, 4 Drawing Sheets

OTHER PUBLICATIONS

SyncML Sync Protocol, Version 1.1, Feb. 15, 2002, pp. 1-62 [online] [retrieved on Jun. 9, 2002] Retrieved from http://www.syncml.org/docs/syncml_sync_protocol_v11_20020215.pdf.

IBM, et al., 1996. "vCard. The Electronic Business Card, Version 2.1," A *versit* Consortium Specification, Sep. 18, 199, pp. 1-40 [online] [retrieved on Jun. 9, 2002].

SyncML "Building an Industry-Wide Mobile Data Synchronization Protocol." SyncML White Paper. Version 1.0 [online] [retireved on Jun. 9, 2002]Available from http://www. SyncML.org.

Rivest, R. "The MDS Message-Digest Algorithm." Network Working Group Requst for Comments: 1321, pp. 1-19 [online] [retireved on Jun. 10, 2002]. Retrieved from http://www.ietf.org/rfc/rfc1321.txt.

\* cited by examiner

METHOD, SYSTEM AND PROGRAM FOR SYNCHRONIZING DATA

BACKGROUND OF THE INVENTION

1. Field of the Invention

The present invention relates to a method, system, and program for synchronizing data.

2. Description of the Related Art

Many small mobile devices, such as hand held computers, Personal Digital Assistants (PDAs), etc., utilize the SyncML synchronization protocol to synchronize data at a remote central server. Handheld computers, mobile phones, pagers, laptops, Personal Digital Assistant (PDA), etc., may synchronize their data with network applications, desktop calendars, and other locations where information is stored. This ability to readily access and synchronize information is key to the pervasive nature of mobile computing.

Occasionally, conflicts may need to be resolved between the data at the remote devices and the central data location, or server. Mobile device users may retrieve data from the network and store the data on the mobile device, where they access and manipulate the local copy of the data. Periodically, users reconnect with the network to send any local changes back to the networked data repository. Users also have the opportunity to learn about updates made to the networked data while the device was disconnected. Occasionally, they need to resolve conflicts among the updates made to the networked data and/or local copy of the data at the mobile device. This reconciliation operation where updates are exchanged and conflicts are resolved is known as data synchronization, where two sets of data are processed to make the two sets identical. For a mobile device, synchronization applies to the data that the mobile device stores locally.

In the SyncML protocol, a SyncML client, such as a mobile phone, pager, PDA, etc., sends modifications to data to a SyncML server. The SyncML server is responsible for performing the synchronization analysis when receiving client modifications. If for some reason, the client and server lose synchronization in a manner that results in errors or synchronize for the first time, either the server or client may initiate a slow synchronization (slow sync). Slow sync is a two-way synchronization in which all items in one or more database are compared with each other on a field-by-field basis. In the slow sync process, the client sends all its data in a client database stored in the client device to the server, and the server performs the sync analysis on a field-by-field basis between the received client data and the server data. After the slow sync analysis, the server returns all needed modifications back to the client. Further details of the slow sync and other synchronization methods are discussed in the publication "SyncML Sync Protocol, Version 1.1", (February 2002), available at www.syncml.org, which publication is incorporated herein by reference in its entirety.

Because a slow sync operation requires an analysis of every record in a database as maintained at a client and server on a field-by-field basis, the slow sync process can take a considerable amount of time and consume significant network bandwidth resources to transfer all records in the database. Network bandwidth and transmission time is even more crucial for wireless networks where the transmission bandwidth is significantly less than that of a high speed transmission line based network.

Accordingly, there is a need in the art for improved techniques for synchronizing data between clients and servers.

SUMMARY OF THE PREFERRED EMBODIMENTS

Provided are a method, system, and program for synchronizing data. A client data record is received from a client and a determination is made of a server data record corresponding to the client data record and a stored digest generated from a previously received version of the received client data record. A current digest is computed from the received client data record. A determination is then made as to whether the computed current digest matches the stored digest. The server data record is updated with modified data from the received client data record if the computed digest and stored digest do not match.

In further implementations, a determination is made as to whether the server data record corresponding to the received client data record was modified, wherein the server data record is updated with the modified data from the received client data record if the server data record was not modified. In such case, modified data from the server data record may be transmitted to the client if the server data record was modified and the current and stored digests match.

Still further, a conflict resolution may be applied if the server data record was modified and the current and stored digests do not match to determine one of updating the server data record with modified data from the received client data record or transmitting modified data from the server data record to the client.

Yet further, the server data record may maintain information on a set of property values and the client data record may maintain a subset of the set of property values maintained in the server data record.

Described implementations provide techniques for synchronizing data records between a client and server, where a digest of a previously received client data record is used to determine whether the client has modified the transmitted client data record. In this way, the client and server may maintain different subsets of information and the digest may be used to determine whether the data from the client or server has changed since the last time the digest was generated.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
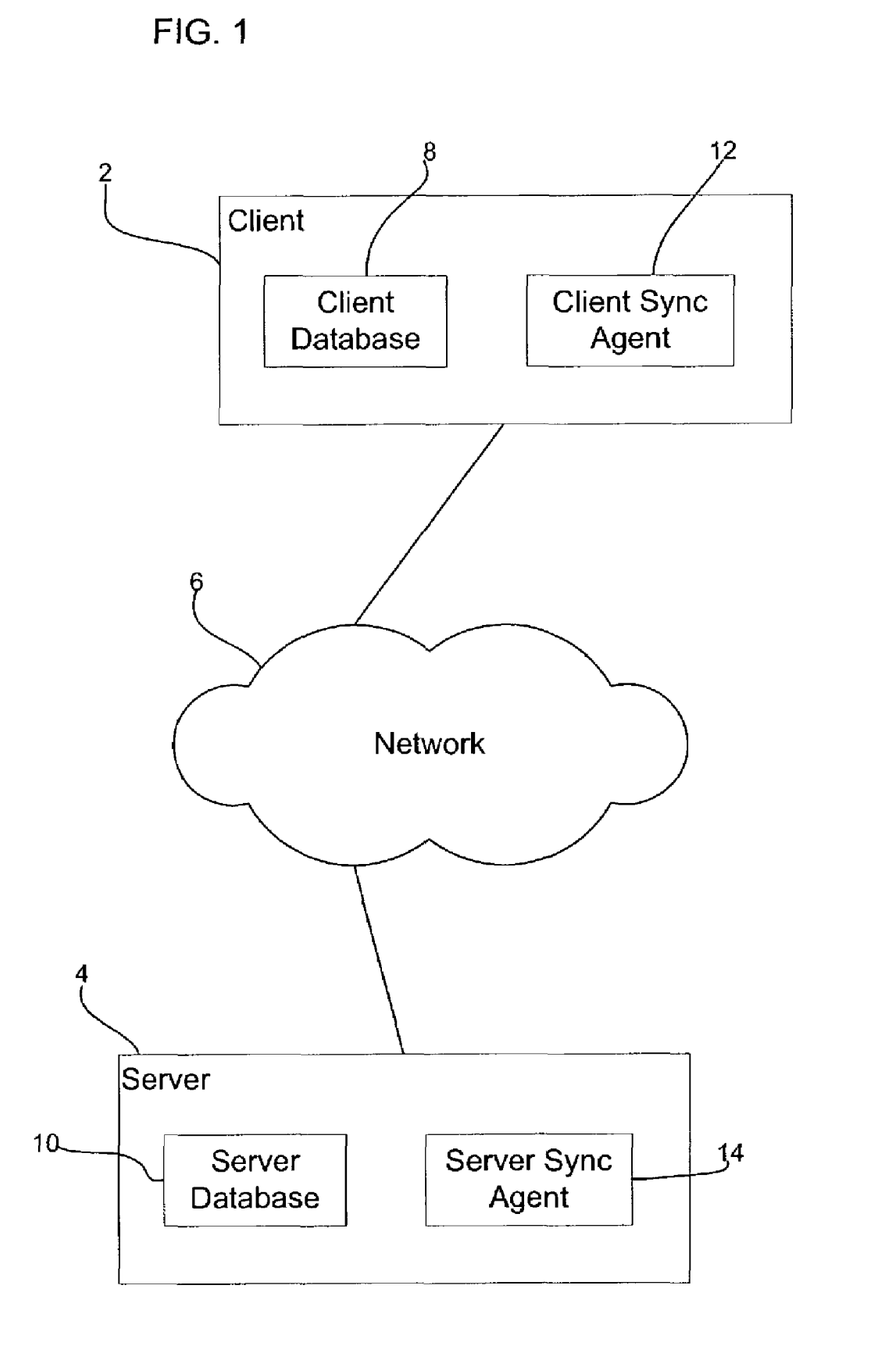
FIG. 1 illustrates a computing environment in which aspects of the invention are implemented.

FIG. 1 illustrates a computing environment in which aspects of the invention are implemented. A client system 2 and server system 4 communicate over a network 6, where the network may comprise a wireless network or network data transmission lines between the network 6 and the systems 2 and 4. The network may comprise the Internet, an Intranet, a Wide Area Network (WAN), Local Area Network (LAN), Storage Area Network (SAN), etc.) using any network communication protocol known in the art. Although only one client 2 is shown, there may be multiple client systems that communicate with the server 4. The client 2 includes a client database 8 of records, such as an address database of electronic business card records. The server 4 includes a server database 10 maintaining records corresponding to the records maintained in one or more client databases 8 in one or more clients 2. The client 2 and server 4 also include a client 12 and server 14 sync agents, respectively, to perform synchronization between the records in the client database 8 and the server database 10.

The client 2 may comprise a remote computing device capable of remote communication with the network 6, such as a Personal Digital Assistant (PDA), pager, cellular phone, hand held computer, laptop computer, satellite device, etc. Alternatively, the client 2 may comprise other types of computing devices, such as workstations, desktop computers, servers, mainframes, etc. The server 4 may comprise a server class machine or any other computer device capable of storing a server database 10 maintaining database records for one or more clients 2. The client 8 and server 10 databases may store any type of data, such as address information, electronic business cards, calendar information, e-mail messages or any other type of information capable of being maintained in a database. The databases 8 and 10 may comprise any type of database known in the art, such as a relational database, object oriented database, or any other data structure capable of maintaining information on one or more records having common fields. The client 12 and server 14 sync agents may utilize any protocol known in the art to perform synchronization of the databases 8 and 10 over the network 6. For instance, in certain implementations, the sync agents 12 and 14 may utilize the SyncML protocol discussed above.

Figure 2:
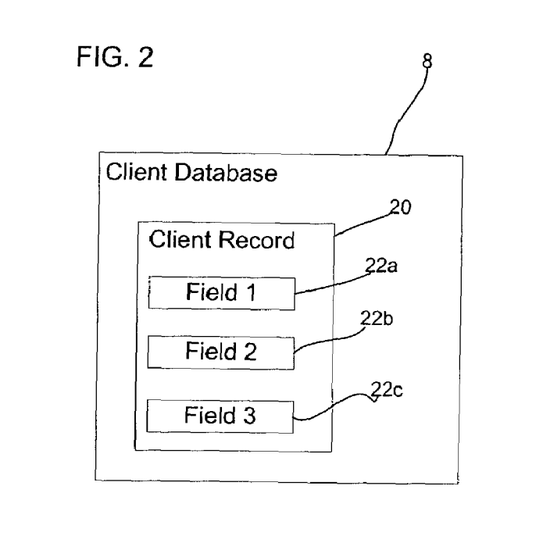
FIG. 2 illustrates a format of a client record used with implementations of the invention.
Figure 3:
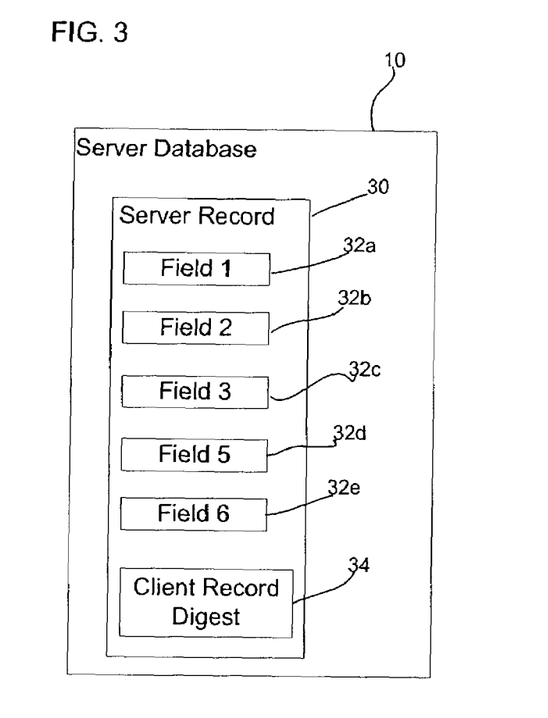
FIG. 3. illustrates a format of a server record used with implementations of the invention.

FIG. 2 illustrates an example of the format of client records 20 maintained in the client database 8. The client record 20 has data fields 22a, 22b, and 22c. FIG. 3 illustrates an example of the format of server records 30 maintained in the server database 10, where the server record 30 has data fields 32a, 32b, 32c, 32d, and 32e. In the example, the client data fields 22a, 22b, 22c and server data fields 32a, 32b, 32c would maintain the same data. However, the server has additional data in fields 32d and 32e that is not maintained at the client. Such a situation may occur when the client 2 is a remote device that has limited storage capability and only maintains a subset of the data that the server database 10 maintains. Alternatively, such a situation may occur when the server record 30 maintains data that is not needed or not intended for access by the client 2. The server database 10 also maintains a client record digest 34 with a server record 30, where the client record digest 34 comprises a computed value based on the client record 20 corresponding to the server record 30. The client record digest 34 may comprise a checksum value calculated from the content of the client record 20 that is intended to provide a unique representation of the client record 20. In certain implementations, the client record digest 34 may be generated using the MD5 message-digest algorithm that produces as output a 128-bit "fingerprint" or "message digest" of the input client record 20, where it is computationally infeasible to produce two messages having the same message digest. Further details of the MD5 message digest algorithm are described in the publication "The MD5 Message-Digest Algorithm", published by the Internet Engineering Task Force (IETF) as "Request for Comments: 1321" (April 1992), which publication is incorporated herein by reference in its entirety. Alternatively, any algorithm known in the art that is capable of generating unique output codes from input can be used to generate the client record digest 34 from the input client record 20. In certain implementations, the digest 34 may be fewer bytes than the input client record 20 in order to conserve storage space at the server 4.

A corresponding client 20 and server 30 record that maintain data for a same record may have a common unique identifier identifying the particular record that is represented in both the client 8 and server 10 databases in corresponding client 20 and server 30 records. For instance, in certain implementations the databases 8 and 10 may maintain contact information using the vCard format, where each card for a contact may have any number of attributes for a particular person or entity for which information is maintained in a vCard object. Such attributes may comprise the name of the person or organization, home address, work address, phone numbers, e-mail, birth date, etc. If the client database 8 maintains a subset of the data maintained in the server database 10, then the client database 8 may not include all of the properties maintained in the server vCard in the server database 10 to conserve client 2 storage resources. Further details of the vCard object format are described in the publication "vCard Specification, Version 2.1" (1996), available on the Internet at ww.icm.org, which publication is incorporated herein by reference in its entirety.

Figure 4:
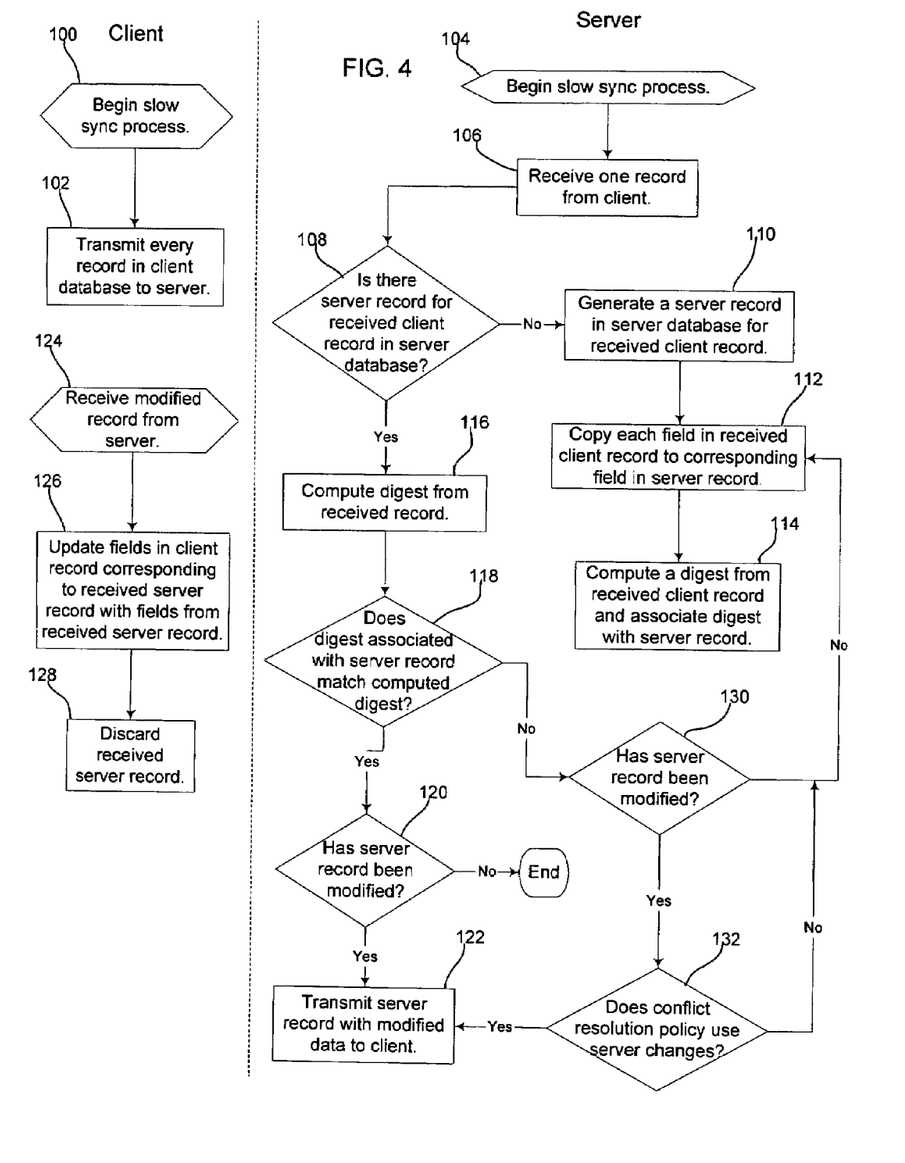
FIG. 4 illustrates logic implemented in the server to synchronize data records between the client and server in accordance with implementations of the invention.

FIG. 4 illustrates logic implemented in the client 12 and server 14 sync agents to perform synchronization in accordance with implementations of the invention. A slow sync process is initiated at blocks 100 and 104 at the client 12 and server 14, respectively, where either the client 12 or server 14 sync agent may initiate the slow synchronization process. Slow synchronization refers to a process where all records in the client database 8 are processed by the server sync agent 14 and may comprise the slow sync process specified in the SyncML protocol or any other device synchronization protocol known in the art. As part of the slow sync process, the client sync agent 12 transmits every client record 20 in the client database 8 to the server sync agent 14 to consider.

In response (at block 106) to receiving a client record 20, having one or more fields of property values 22a, 22b, 22c, the server sync agent 14 determines (at block 108) whether the server database 10 maintains a server record 30 corresponding to the received client record 20, such as an electronic business card for the same person, calendar record, etc. If (at block 108) there is no corresponding server record 30, such as the case if the record was created by the client database 8 in the client 2, then the server sync agent 14 generates (at block 110) a server record 30 in the server database 14 and copies data from each field 22a, 22b, 22c from the received client record 20 to the corresponding fields 32a, 32b, 32c in the generated server record 30. In implementations where the client records 20 include a subset of fields 22a, 22b, 22c that the server records 30 maintains, those fields 32d and 32e in the server records 30 not included the client records 20 remain empty until such additional fields are subsequently updated to a user having access to such fields 32d and 32e. The server sync agent 14 further computes (at block 114) a client record digest 34 from the received client record 20 and stores and associates the generated client record digest 34 with the server record 30 corresponding to the received client record 20.

If(at block 108) the server database 10 already has a server record 30 corresponding to the received client record 20, then the server sync agent 14 computes (at block 116) a digest from the received client record 20, using the same algorithm used to compute the client record digest 34 from the previously received version of the client record 20 and compares (at block 118) the digest computed from the received record (at block 116) with the client record digest 34 associated with the server record 30. If(at block 118) the digests match and the server record 30 has been modified (at block 120), then only the server record has been modified since the last time the client 20 and server 30 records were synchronized. The server sync agent 14 may use any technique known in the art, such as flags or time stamps, to determine whether the server record 30 has been modified since the last synchronization. In such case, the server sync agent 14 transmits (at block 122) the server record 30 with the modified data to the client sync agent 12. In alternative implementations, the server sync agent 14 may only transmit the modified fields 32a, 32b, 32c to the client sync agent 12. If(at block 120) the digests match and the server record 30 has not been modified, then neither the client 2 nor server 4 has modified the client 20 and server 30 records, and control ends as no synchronization is necessary.

Upon receiving (at block 124) the modified server record 30 or modified fields 32a, 32b, 32c transmitted by the server sync agent 14 (at block 122), the client sync agent 12 updates (at block 126) the fields 22a, 22b, 22c in the client record 20 corresponding to the received server record 30 with the data in the modified fields 32a, 32b, 32c in the received server record 30 so that the client 20 and server 30 records are synchronized with respect to the common fields 22a, 22b, 22c and 32a, 32b, 32c, respectively.

If (at block 118) the computed digest and stored client record digest 34 do not match, then the server sync agent 14 determines (at block 130) whether the server record has been modified. If so, then both the client 20 and server 30 records were modified by the client 2 and server 4. In such case, the server sync agent 14 applies a conflict resolution policy in a manner known in the art to determine whether the server or client modifications apply. If (at block 132) the conflict resolution policy specifies to use the server changes, then the server sync agent 12 transmits (at block 122) the modified server record 30, or modified fields 32a, 32b, 32c, to the client sync agent 12 to apply to the client record 20 in the client database 8. Otherwise, if (at block 132) the conflict resolution indicates to use the modifications in the client record 20, then control proceeds to block 112 where the server sync agent 12 updates the server record 30 with the modified data in the corresponding client record 20 so that the server record 30 reflects the client modifications. Further, if (at block 130) the client record 20 was modified, as indicated by the digests not matching (at block 118) and no changes were made to the server record 30, as determined at block 130, then control proceeds to block 112 to update the server record 30 with the modified data from the received client record 20 and to recalculate the client record digest 34 from the modified received client record 20 for use in a subsequent slow sync operation.

After processing all client records 20, the server sync agent 14 may then transmit any new server records 30 not included in the client database 12 or delete the server records 30 from the server database 10 corresponding to client records 20 deleted from the client database 12 since the last synchronization. The client sync agent would generate and store a client record 20 for the received new server record 30 and only include data from fields 32a, 32b, 32c in the new server record 30 in the subset of fields 22a, 22b, 22c in the generated client record 20.

The described implementations utilize a digest calculated form the last transmitted client record to determine whether client changes have been made when performing a slow sync or other synchronization process. This provides an improved technique for checking whether client modified a database record during a synchronization process.

ADDITIONAL IMPLEMENTATION DETAILS

The described synchronization process may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the digest was used to detect client modifications to client records during a slow sync process. Alternatively, the above described techniques may apply to any synchronization process, and is not limited to a slow sync process.

In certain implementations, the client 2 comprises a mobile device that communicates with the server 4 over a wireless network 6. Alternatively, the client 2 and server 4 may connect through data transmission lines connected to the network 6. Still further, the client 2 and server 4 may comprise processes executing in programs on a same computer system that communicate through a shared memory space of the computer system.

The client and server records may comprise any type of data, such as addresses in an address database, electronic business cards (e.g., vCards), calendar appointments in a calendar database, electronic mail messages in an e-mail store, or any other type of data that may be represented and maintained in a database.

Certain described implementations concerned a modification of the SyncML slow sync process to improve the performance of the slow sync process. However, in alternative implementations, the above described technique for determining how to determine client modifications and handle such modifications may apply to any synchronization process known in the art, including synchronization processes for protocols other than SyncML and for SyncML synchronization processes other than the slow sync process.

The illustrated logic of FIG. 4 indicates certain events occurring in a certain order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

Figure 5:
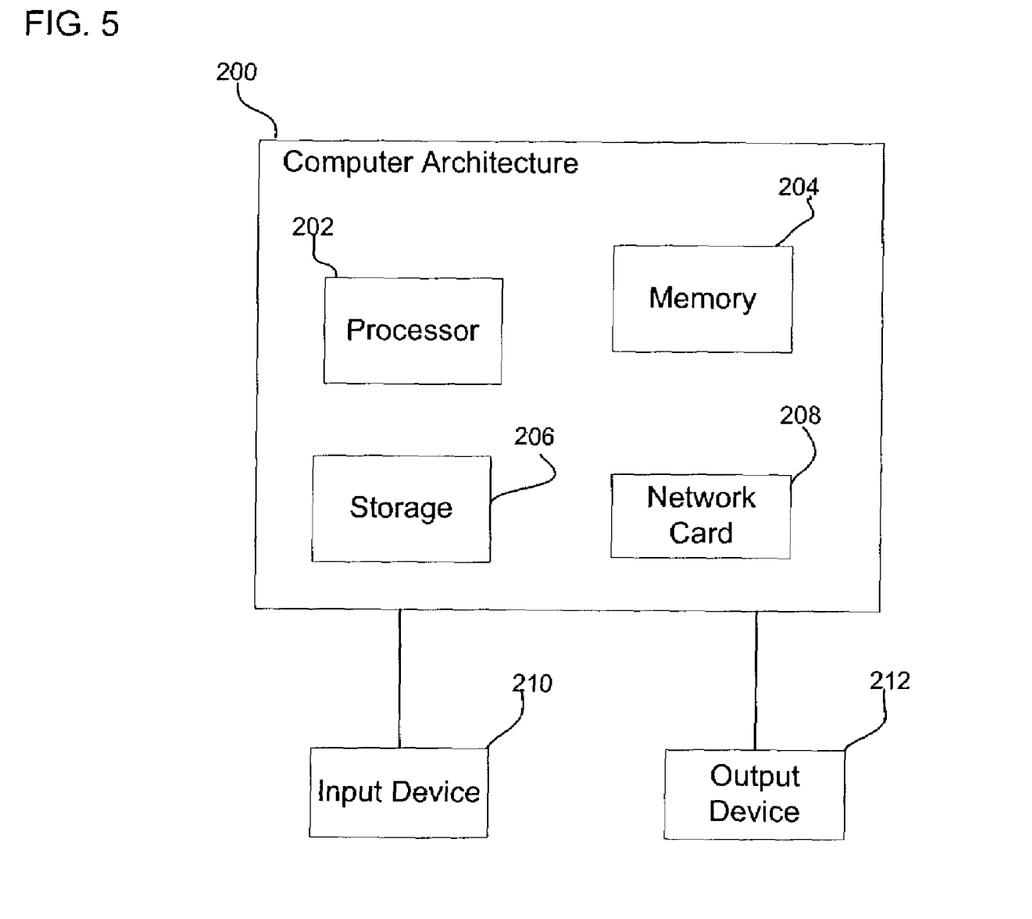
FIG. 5 illustrates a computer architecture which may be utilized with certain implementations of the invention.

FIG. 5 illustrates one implementation of the architecture of the client 2 and server 4 systems. The systems 2 and 4 may implement a computer architecture 200 having a processor 202 (e.g., a microprocessor), a memory 204 (e.g., a volatile memory device), and storage 206 (e.g., a non-volatile storage, such as magnetic disk drives, optical disk drives, a tape drive, etc.). The storage 206 may comprise an internal storage device or an attached or network accessible storage. Programs in the storage 206 are loaded into the memory 204 and executed by the processor 202 in a manner known in the art. The architecture further includes a network card 208 to enable communication with a network, wherein the communication may be wireless or occur over a network cable and port. An input device 210 is used to provide user input to the processor 202, and may include a keyboard, mouse, pen-stylus, microphone, touch sensitive display screen, or any other activation or input mechanism known in the art. An output device 212 is capable of rendering information transmitted from the processor 202, or other component, such as a display monitor, printer, storage, etc.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for synchronizing server data records in a server database with client data records in a client database, comprising:

associating server data records in the server database with corresponding client data records from a client in the client database and with stored digests, wherein the stored digest for one server data record is computed from a previously received client data record transmitted from the client that is associated with the server data record, wherein the server data record was previously updated with the previously received client data record;

receiving one of the client data records from the client;

determining one of the server data records corresponding to the received client data record;

computing a current digest from the received client data record;

determining whether the computed current digest matches the stored digest associated with the determined server data record;

checking whether the determined server data record was modified;

updating the determined server data record to include modified data from the received client data record if the computed current digest and stored digest do not match and if the server data record was not modified;

transmitting modified data from the server data record to the client if the server data record was modified and the current and stored digests match; and applying a conflict resolution policy if the server data record was modified and the current and stored digests do not match to determine one of updating the server data record with modified data from the received client data record or transmitting modified data from the server data record to the client.

2. The method of claim 1, wherein the operations of determining the server data record, computing the current digest, determining whether the current and stored digests match, and updating the server data record occur for all client data records in a client database.

3. The method of claim 2, wherein the client and server communicate over a network.

4. The method of claim 1, wherein if there is no server data record determined to correspond to the received client data record, further comprising:

generating a server data record; and storing the data in the received client data record in the generated server data record, wherein the computed current digest is used as the stored digest, and wherein the steps of determining whether the current and stored digests match and updating the server data record occur if there is one server data record determined to correspond with the received client data record.

5. The method of claim 1, wherein the server data record maintains information on a set of property values and wherein the client data record maintains a subset of the set of property values maintained in the corresponding server data record.

6. The method of claim 5, wherein the client and server data records comprise electronic business cards and wherein the property values comprise electronic business card attributes.

7. The method of claim 1, wherein the stored and current digests comprise generated codes that are fewer bytes than the client data records from which the stored and current digests are generated and wherein stored and current digests generated from client data records having different data content produce different digest values.

8. A system for synchronizing data in communication with a client including a client database having client data records, comprising:

a server database including server data records;

means for associating server data records corresponding to client data records from the client and associated with stored digests, wherein the stored digest for one server data record is computed from a previously received client data record associated with the server data record, wherein the server data record was previously updated with the previously received client data record;

means for receiving one of the client data records from the client;

means for determining one of the server data records corresponding to the received client data record;

means for computing a current digest from the received client data record;

means for determining whether the computed current digest matches the stored digest associated with the determined server data record;

means for checking whether the determined server data record was modified;

means for updating the determined server data record to include modified data from the received client data record if the computed current digest and stored digest do not match and if the server data record was not modified;

means for transmitting modified data from the server data record to the client if the server data record was modified and the current and stored digests match; and means for applying a conflict resolution policy if the server data record was modified and the current and stored digests do not match to determine one of updating the server data record with modified data from the received client data record or transmitting modified data from the server data record to the client.

9. The system of claim 8, wherein the system communicates with the client over a network.

10. The system of claim 8, further comprising:

means for generating a server data record if there is no server data record determined to correspond to the received client data record; and means for storing the data in the received client data record in the generated server data record, wherein the computed current digest is used as the stored digest, and wherein the means for determining whether the current and stored digests match and updating the server data record occur is performed if there is one server data record determined to correspond with the received client data record.

11. The system of claim 8, wherein the server data record maintains information on a set of property values and wherein the client data record maintains a subset of the set of property values maintained in the corresponding server data record.

12. The system of claim 11, wherein the client and server data records comprise electronic business cards and wherein the property values comprise electronic business card attributes.

13. The system of claim 8, wherein the stored and current digests comprise generated codes that are fewer bytes than the client data records from which the stored and current digests are generated and wherein stored and current digests generated from client data records having different data content produce different digest values.

14. An article of manufacture for synchronizing server data records in a server database with client data records in a client database within a client, wherein the article of manufacture causes operations to be performed, the operations comprising:

associating server data records in the server database with corresponding client data records from the client and associated with stored digests, wherein the stored digest for one server data record is computed from a previously received client data record transmitted from the client that is associated with the server data record, wherein the server data record was previously updated with the previously received client data record;

receiving one of the client data records from the client;

determining one of the server data records corresponding to the client data record;

computing a current digest from the received client data record;

determining whether the computed current digest matches the stored digest associated with the determined server data record;

checking whether the determined server data record was modified;

updating the determined server data record to include modified data from the received client data record if the computed current digest and stored digest do not match and if the server data record was not modified;

transmitting modified data from the server data record to the client if the server data record was modified and the current and stored digests match; and applying a conflict resolution policy if the server data record was modified and the current and stored digests do not match to determine one of updating the server data record with modified data from the received client data record or transmitting modified data from the server data record to the client.

15. The article of manufacture of claim 14, wherein the operations of determining the server data record, computing the current digest, determining whether the current and stored digests match, and updating the server data record occur for all client data records in a client database, and wherein the server data records are maintained in a server database.

16. The article of manufacture of claim 15, wherein the client and server communicate over a network.

17. The article of manufacture of claim 14, wherein if there is no server data record determined to correspond to the received client data record, further comprising:

generating a server data record; and storing the data in the received client data record in the generated server data record, wherein the computed current digest is used as the stored digest, and wherein the steps of determining whether the current and stored digests match and updating the server data record occur if there is one server data record determined to correspond with the received client data record.

18. The article of manufacture of claim 14, wherein the server data record maintains information on a set of property values and wherein the client data record maintains a subset of the set of property values maintained in the corresponding server data record.

19. The article of manufacture of claim 18, wherein the client and server data records comprise electronic business cards and wherein the property values comprise electronic business card attributes.

20. The article of manufacture of claim 14, wherein the stored and current digests comprise generated codes that are fewer bytes than the client data records from which the stored and current digests are generated and wherein stored and current digests generated from client data records having different data content produce different digest values.

* * * * *